United States Patent
Zhang

(10) Patent No.: US 10,967,897 B2
(45) Date of Patent: Apr. 6, 2021

(54) FOLDABLE GOLF CART

(71) Applicant: NINGBO WENTAI SPORT EQUIPMENT CO., LTD., Zhejiang (CN)

(72) Inventor: Sheng Zhang, Zhejiang (CN)

(73) Assignee: NINGBO WENTAI SPORT EQUIPMENT CO., LTD., Zhejiang (CN)

( * ) Notice: Subject to any disclaimer, the term of this patent is extended or adjusted under 35 U.S.C. 154(b) by 0 days.

(21) Appl. No.: 16/558,308

(22) Filed: Sep. 2, 2019

(65) Prior Publication Data

US 2020/0114944 A1   Apr. 16, 2020

(30) Foreign Application Priority Data

Oct. 15, 2018 (CN) .......................... 201821670256.3

(51) Int. Cl.
*B62B 3/02* (2006.01)
*B62B 3/12* (2006.01)
*B62B 5/06* (2006.01)

(52) U.S. Cl.
CPC ............... *B62B 3/022* (2013.01); *B62B 3/12* (2013.01); *B62B 5/067* (2013.01); *B62B 2202/404* (2013.01); *B62B 2205/00* (2013.01)

(58) Field of Classification Search
CPC ....... B62B 1/12; B62B 2205/12; B62B 1/002; B62B 3/02; B62B 1/125; B62B 2202/24
See application file for complete search history.

(56) References Cited

U.S. PATENT DOCUMENTS

| | | | | |
|---|---|---|---|---|
| 4,657,100 | A * | 4/1987 | Lewis | B62B 1/042 180/19.1 |
| 5,421,604 | A * | 6/1995 | Wu | B62B 1/045 280/47.26 |
| 7,063,340 | B1 * | 6/2006 | Wu | B62B 3/12 280/47.26 |
| 9,079,598 | B1 * | 7/2015 | Oreyang | B62B 3/022 |
| 9,352,200 | B1 * | 5/2016 | Ho | B62B 5/0461 |
| 2005/0269803 | A1 * | 12/2005 | Wu | B62B 3/02 280/651 |
| 2009/0295130 | A1 * | 12/2009 | Liao | B62B 3/12 280/651 |

* cited by examiner

*Primary Examiner* — John D Walters
*Assistant Examiner* — James J Triggs
(74) *Attorney, Agent, or Firm* — JCIP Global Inc.

(57) ABSTRACT

A foldable golf cart includes an upper frame, a lower frame, a handlebar set, a front wheel set, and two rear wheel sets. The upper frame is mounted on the lower frame. The front wheel set is mounted at a front end of the lower frame. The rear wheel sets are rotatably mounted on the left side and the right side of the rear end of the lower frame respectively. The handlebar set is connected with the upper frame through a first lock mechanism, the upper frame is connected with the lower frame through a second lock mechanism, and the first lock mechanism and the second lock mechanism are connected through a link mechanism. When the first lock mechanism is unlocked, the handlebar set is rotated, and at this moment, the link mechanism drives the second lock mechanism to be unlocked.

3 Claims, 12 Drawing Sheets

FOLDABLE GOLF CART

CROSS-REFERENCE TO RELATED APPLICATION

This application claims the priority benefits of Chinese application serial no. 201821670256.3, filed on Oct. 15, 2018. The entirety of the above-mentioned patent application is hereby incorporated by reference herein and made a part of specification.

BACKGROUND

Technical Field

The invention relates to a golf cart, in particular to a foldable gold cart.

Description of Related Art

Golf has been established for hundreds of years. As important tools for transporting golf equipment, golf carts have been widely used. Foldable golf carts which can be folded to reduce the storage size are becoming more and more popular.

Existing foldable golf carts typically comprise an upper frame, a lower frame, a handlebar set, a front wheel set, and two rear wheel sets. The upper frame is mounted on the lower frame, the handlebar set is mounted on an upper portion of the upper frame, the front wheel set is mounted at a front end of the lower vehicle frame, and the two rear wheel sets are respectively mounted on a left side and a right side of a rear end of the lower frame. Due to the fact that multiple lock mechanisms have to be released when the handlebar set, the upper frame, and the lower frame are to be folded, the existing foldable golf carts are inconvenient to use.

SUMMARY

The technical issue to be settled by the invention is to provide a foldable golf cart which has a handlebar set, an upper frame and a lower frame easy to fold, and is convenient to use.

The technical solution adopted by the invention to settle the above technical issue is as follows. A foldable golf cart comprises an upper frame, a lower frame, a handlebar set, a front wheel set, and two rear wheel sets. The upper frame is mounted on the lower frame, and the front wheel set is mounted at a front end of the lower frame. The two rear wheel sets are rotatably mounted on a left side and a right side of a rear end of the lower frame respectively. The handlebar set is connected with the upper frame through a first lock mechanism, the upper frame is connected with the lower frame through a second lock mechanism, and the first lock mechanism and the second lock mechanism are connected through a link mechanism. When the first lock mechanism is unlocked, the handlebar set is rotated, and at this moment, the link mechanism drives the second lock mechanism to be unlocked.

The first lock mechanism comprises a joint assembly, a mounting base, a connecting shaft connected with the link mechanism, and a joint lock piece used for locking the joint assembly and the mounting base. The joint assembly is fixedly connected with the handlebar set and is rotatably arranged on the mounting base, a guide groove is formed in an inner side of the joint assembly and has an uneven surface, a first guide hole which extends vertically is formed in the mounting base, and the connecting shaft is located in the guide groove and the first guide hole. After the joint lock piece is unlocked, the connecting shaft synchronously moves in the guide groove and the first guide hole when the handlebar set drives the joint assembly to rotate. In this structure, after the joint assembly and the mounting base are released by the joint lock piece, the handlebar set is rotated to drive the joint assembly to rotate synchronously, at this moment, the connecting shaft in contact with the uneven surface of the guide groove in the joint assembly starts to move upwards, and the link mechanism connected with the connecting shaft is driven to move synchronously and drives the second lock mechanism to move to be unlocked; and the structure is simple, and operation is convenient.

The link mechanism comprises a first slider, a second slider, a drive member, an elastic mechanism, and a stationary shaft connected with the second lock mechanism. The upper frame comprises an upper frame tube, and the first slider is arranged at the upper end of the upper frame tube. A cavity is formed in the mounting base, and an upper end of the upper frame tube is located in the cavity. A first through hole is formed in the first slider, and the connecting shaft is located in the first through hole. When the handlebar set is rotated to drive the joint assembly to rotate, the connecting shaft synchronously moves in the guide groove and the first guide hole. The second slider is arranged at a lower end of the upper frame tube. The drive member is located in the upper frame tube, an upper end of the drive member is fixedly connected with the first slider, and a lower end of the drive member is fixedly connected with the second slider. A lower end of the elastic mechanism is connected with the second slider, and an upper end of the elastic mechanism is connected with the upper frame tube. A second through hole is formed in the second slider, two second guide holes which extend vertically are formed in side walls of the lower end of the upper frame tube, and the stationary shaft is located in the two second guide holes and the second through hole. In this structure, the first slider is driven to move when the connecting shaft moves, the first slider drives the second slider to move through the drive member, then the second slider drives the stationary shaft to move to be separated from the second lock mechanism, and thus, the second lock mechanism is unlocked to transmit a force applied to the handlebar set.

The second lock mechanism comprises a connecting base fixed to the lower frame, a sliding assembly, a connecting assembly, and a rotary shaft. The sliding assembly is mounted on the lower frame and moves forwards and backwards on the lower frame when stressed, the connecting assembly is connected with the sliding assembly and the upper frame tube, the sliding assembly is connected with each of the two rear wheel sets through a connecting rod, a concave groove and a clamping groove are formed in the connecting base, and a lower end of the lower frame is located in the concave groove and is mounted on the connecting base through the rotary shaft. When the second lock mechanism is locked, the stationary shaft is located in the clamping groove to be fixed. In this structure, the second lock mechanism is locked through the cooperation of the groove and the stationary shaft, so that the structure is simple, and unlocking is convenient.

Compared to the prior art, the foldable golf cart of the invention has the following advantages. The handlebar set and the upper frame are connected through the first lock mechanism, the upper frame and the lower frame are connected through the second lock mechanism, and the first lock mechanism and the second lock mechanism are connected through the link mechanism. When the first lock mechanism is unlocked, the handlebar set is rotated, and at this moment, the link mechanism drives the second lock mechanism to be unlocked; and the handlebar set can be operated to unlock the second lock mechanism, then the handlebar set, the upper frame and the lower frame can be folded easily, and using is convenient.

DESCRIPTION OF THE EMBODIMENTS

Figure 1A:
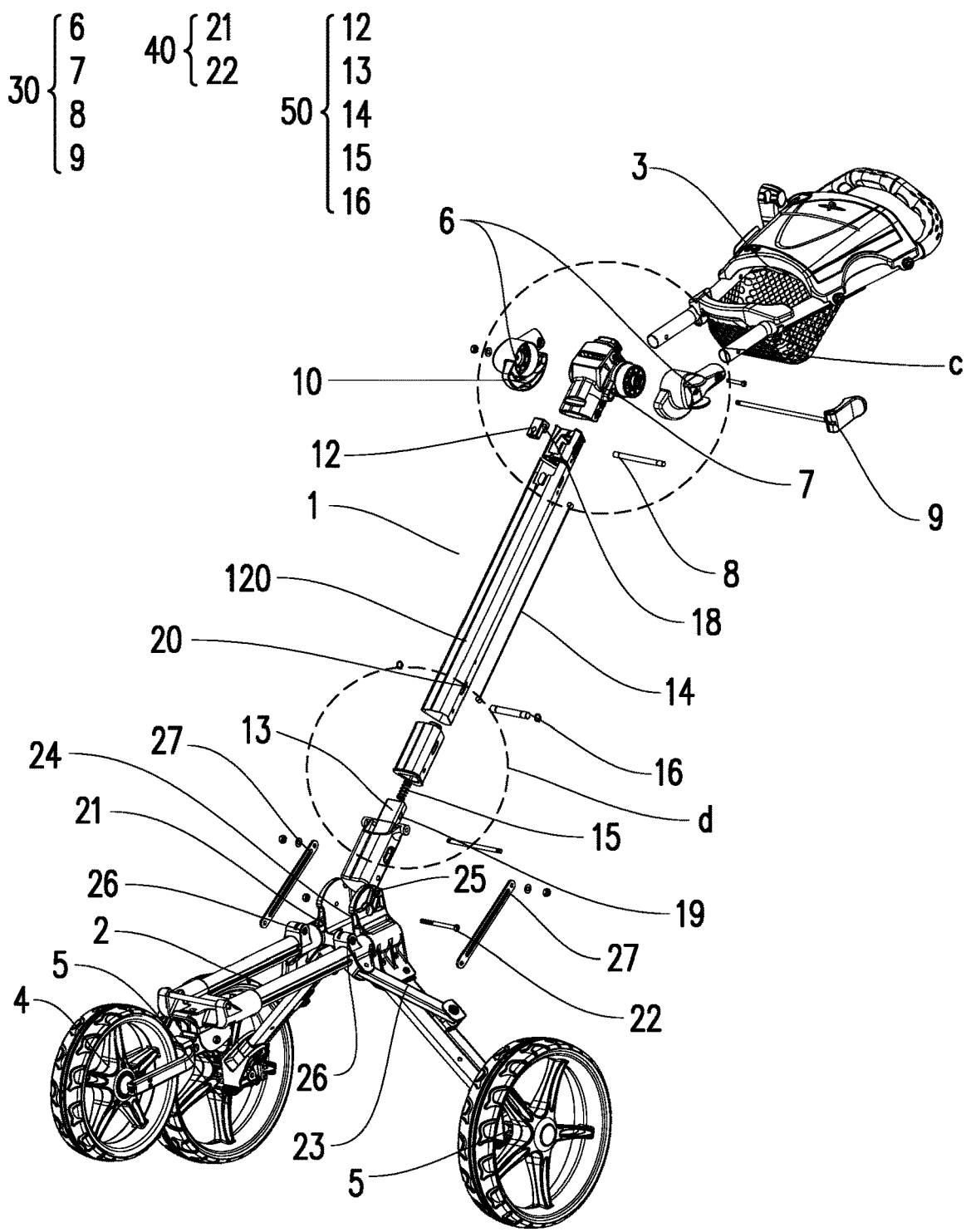
FIG. 1(a) is an exploded view of a foldable golf cart of the invention.
Figure 1B:
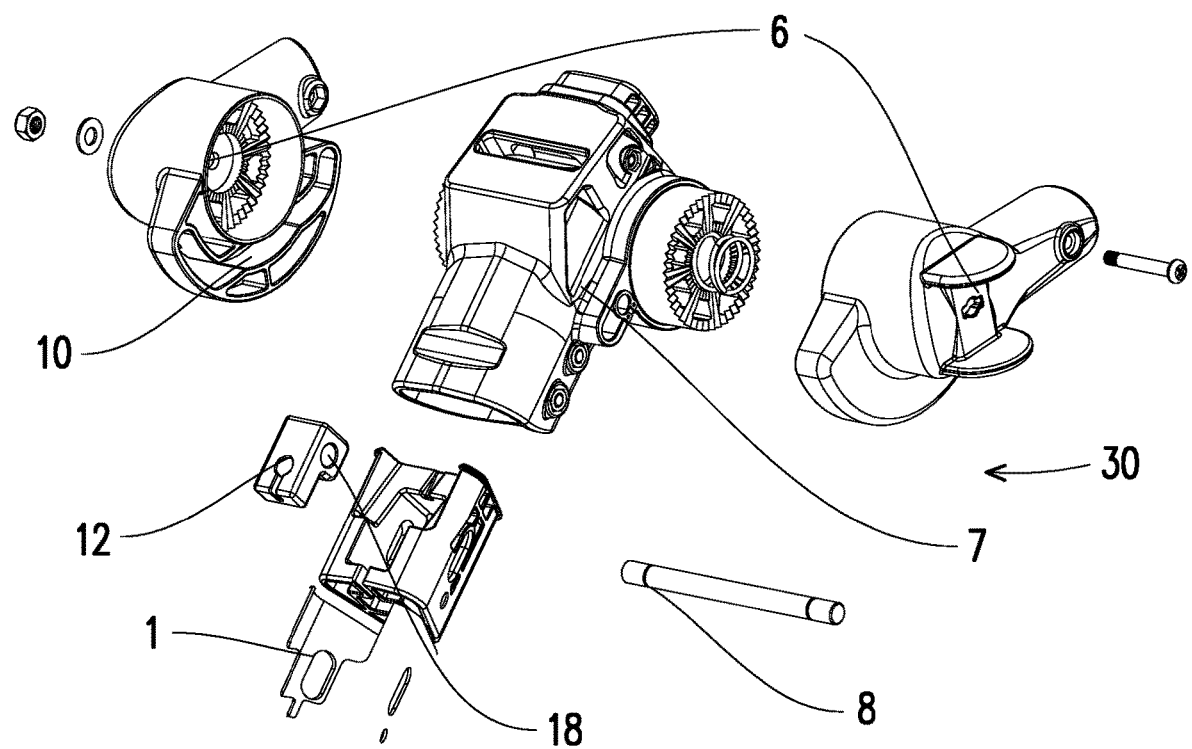
FIG. 1(b) is an enlarged view of part c in FIG. 1(a)
Figure 1C:
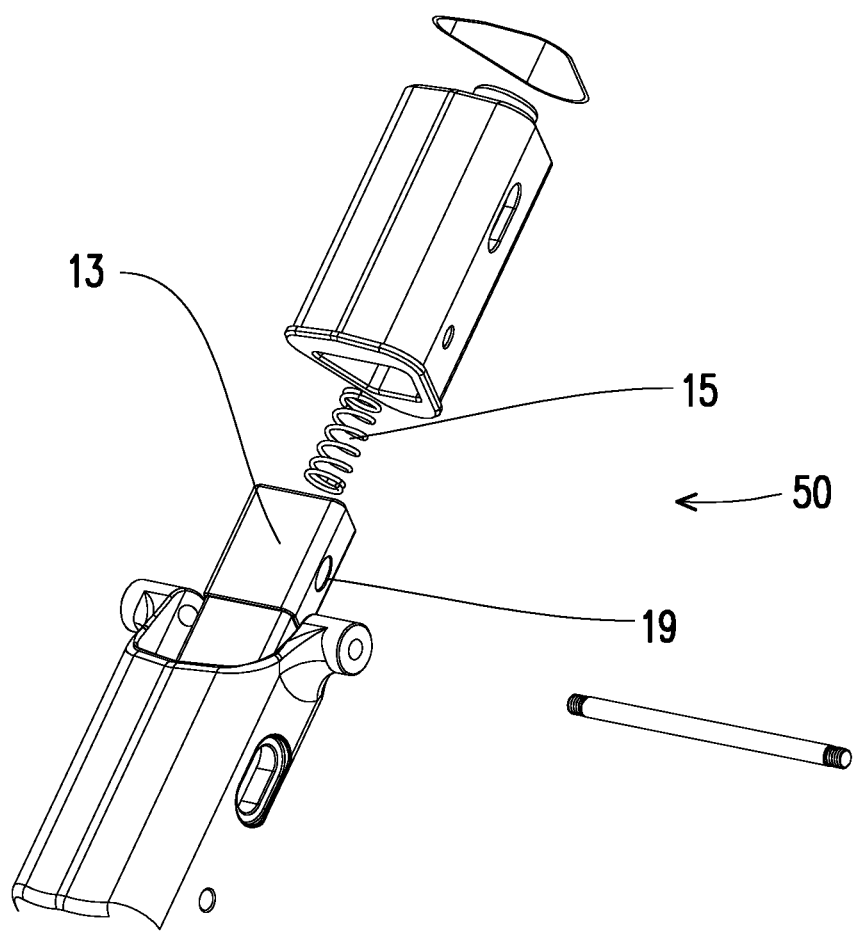
FIG. 1(c) is an enlarged view of part d in FIG. 1(a)
Figure 2:
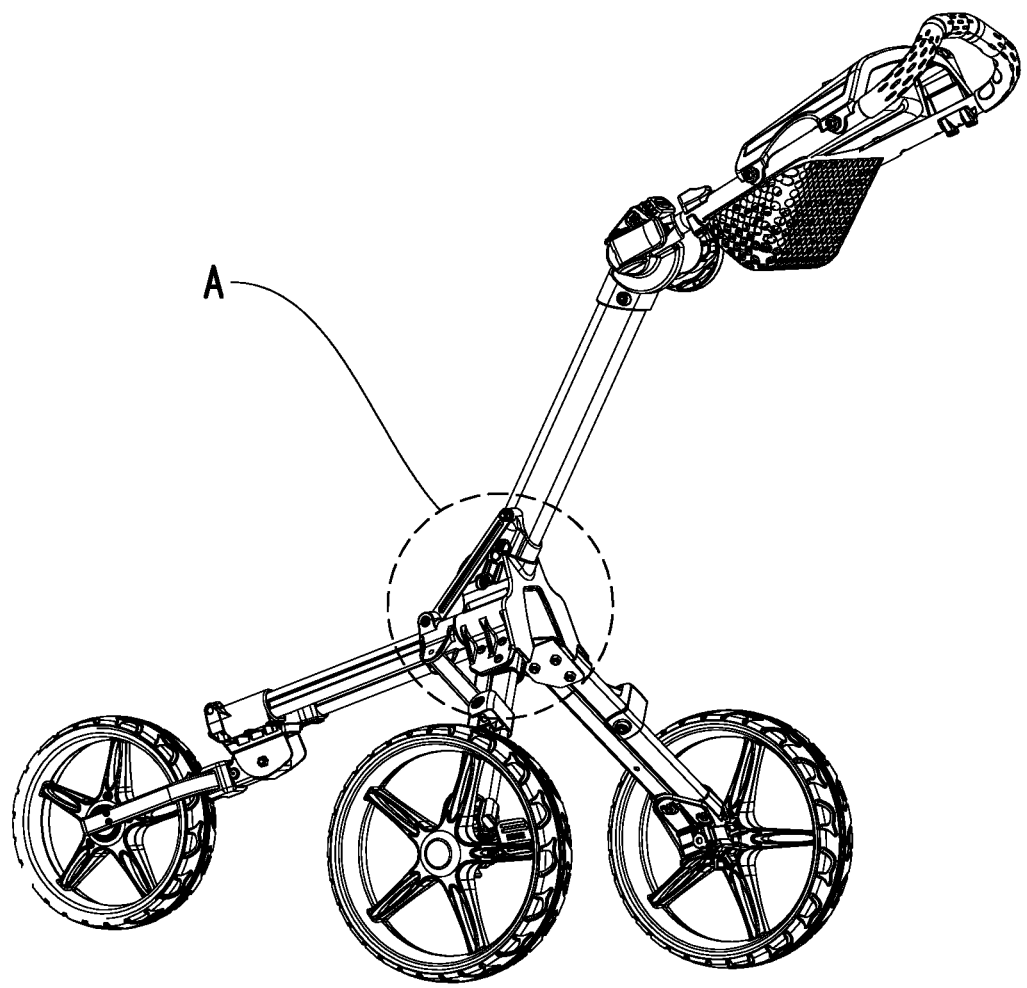
FIG. 2 is a perspective view of the foldable golf cart in an unfolded state of the invention.
Figure 3A:
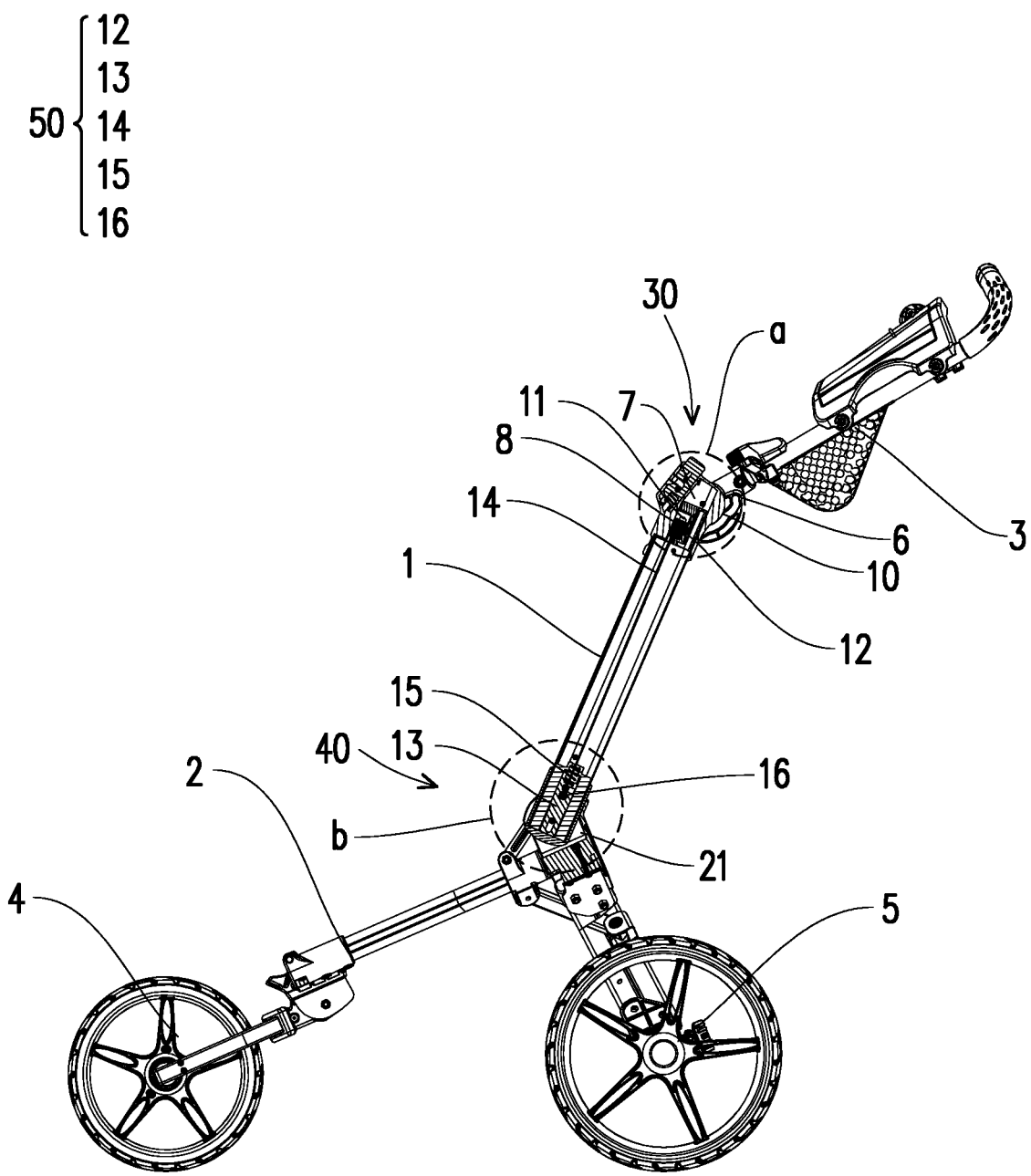
FIG. 3(a) is a partial sectional view of FIG. 2.
Figure 3B:
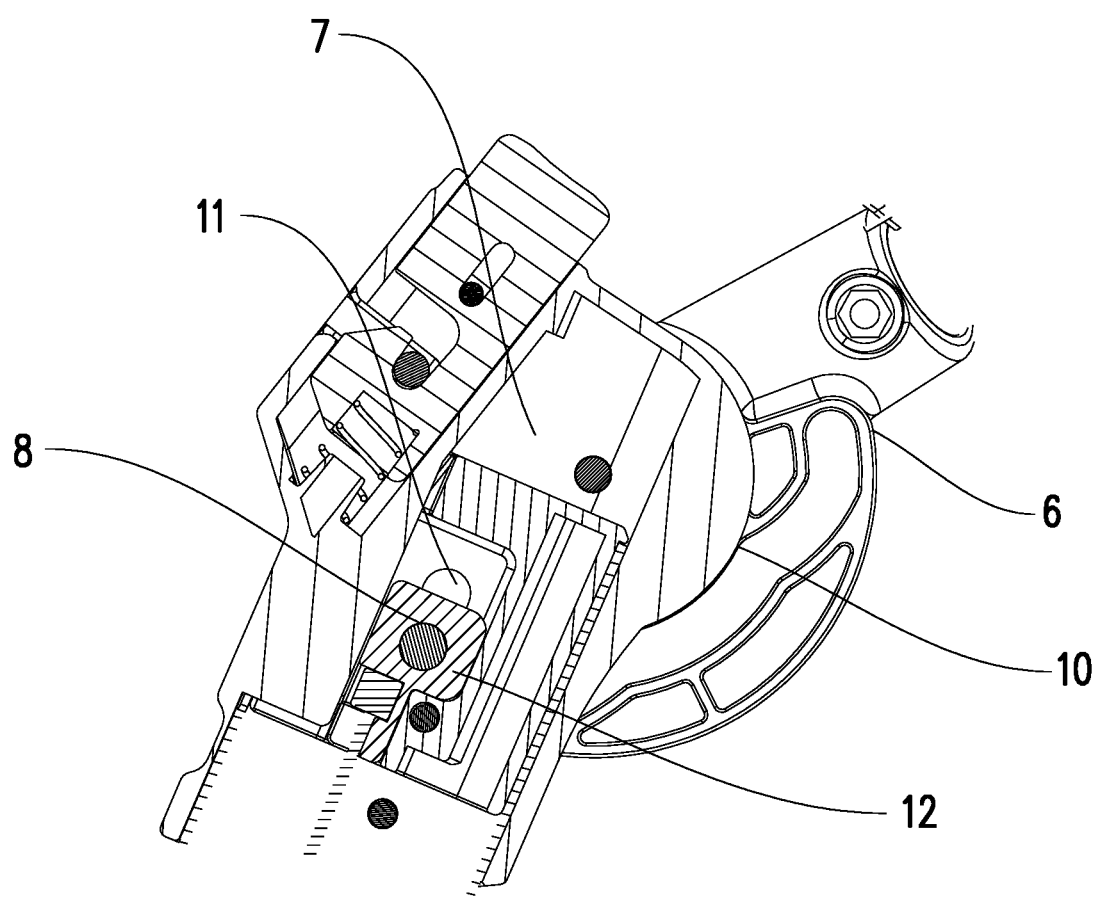
FIG. 3(b) is an enlarged view of part a in FIG. 3(a)
Figure 3C:
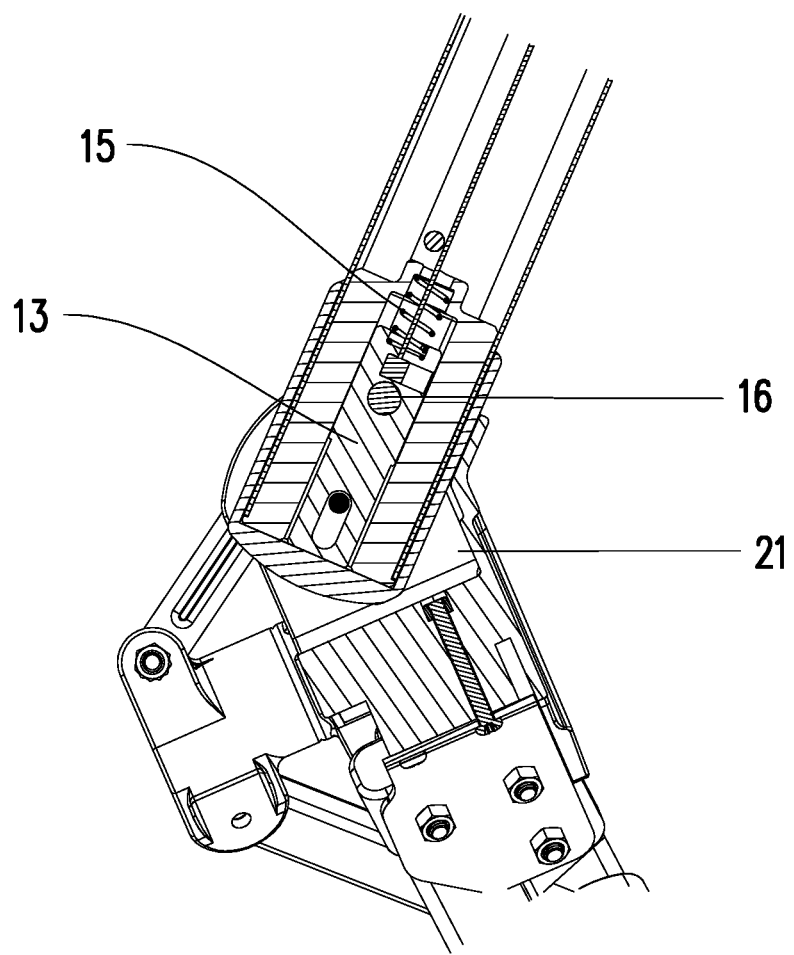
FIG. 3(c) is an enlarged view of part b in FIG. 3(a)
Figure 4:
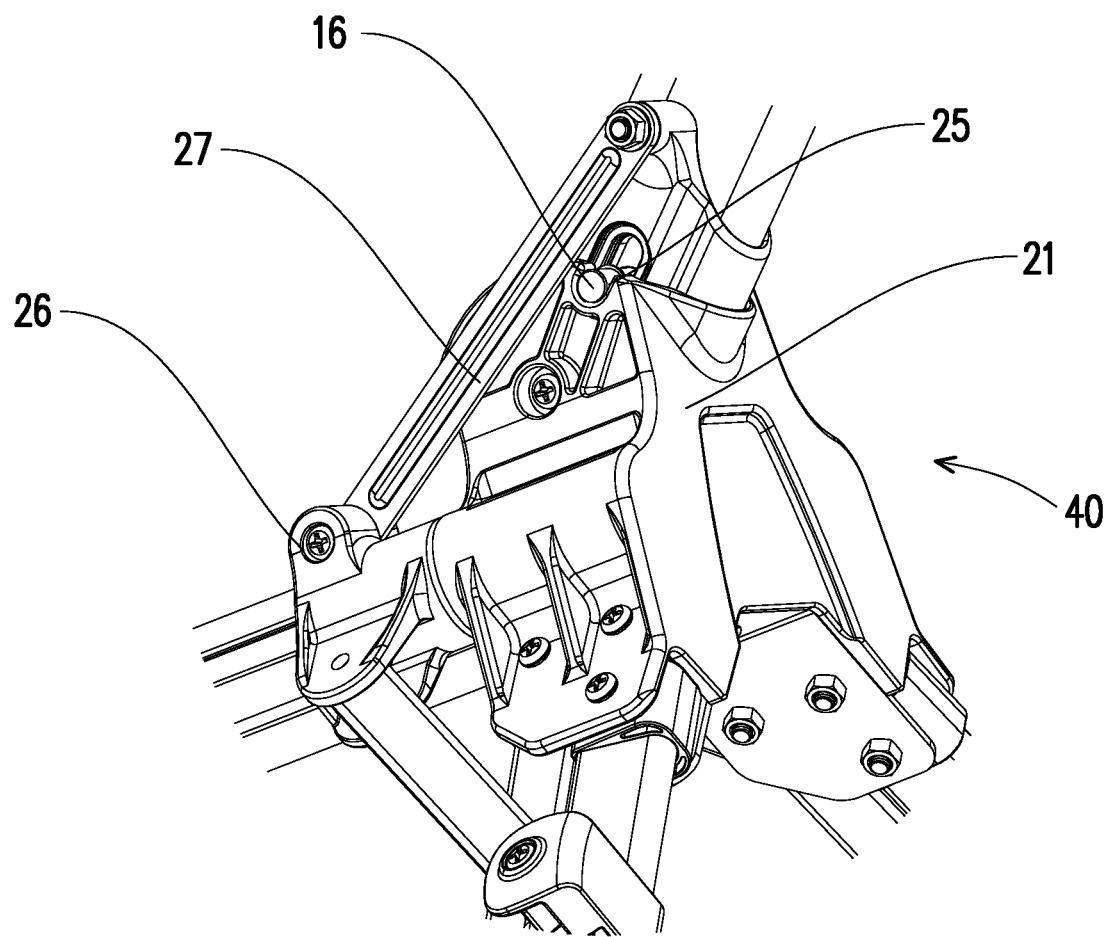
FIG. 4 is an enlarged view of part A in FIG. 2.
Figure 5:
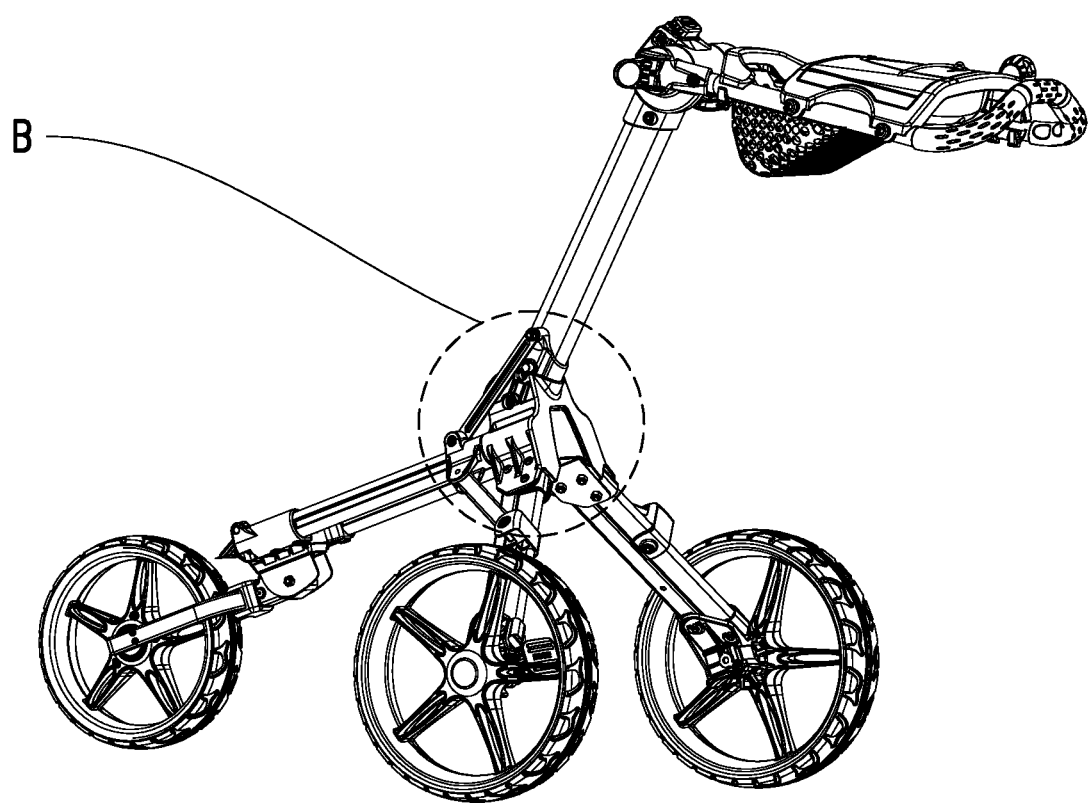
FIG. 5 is a perspective view of the foldable golf cart which is unlocked to be folded of the invention.
Figure 6:
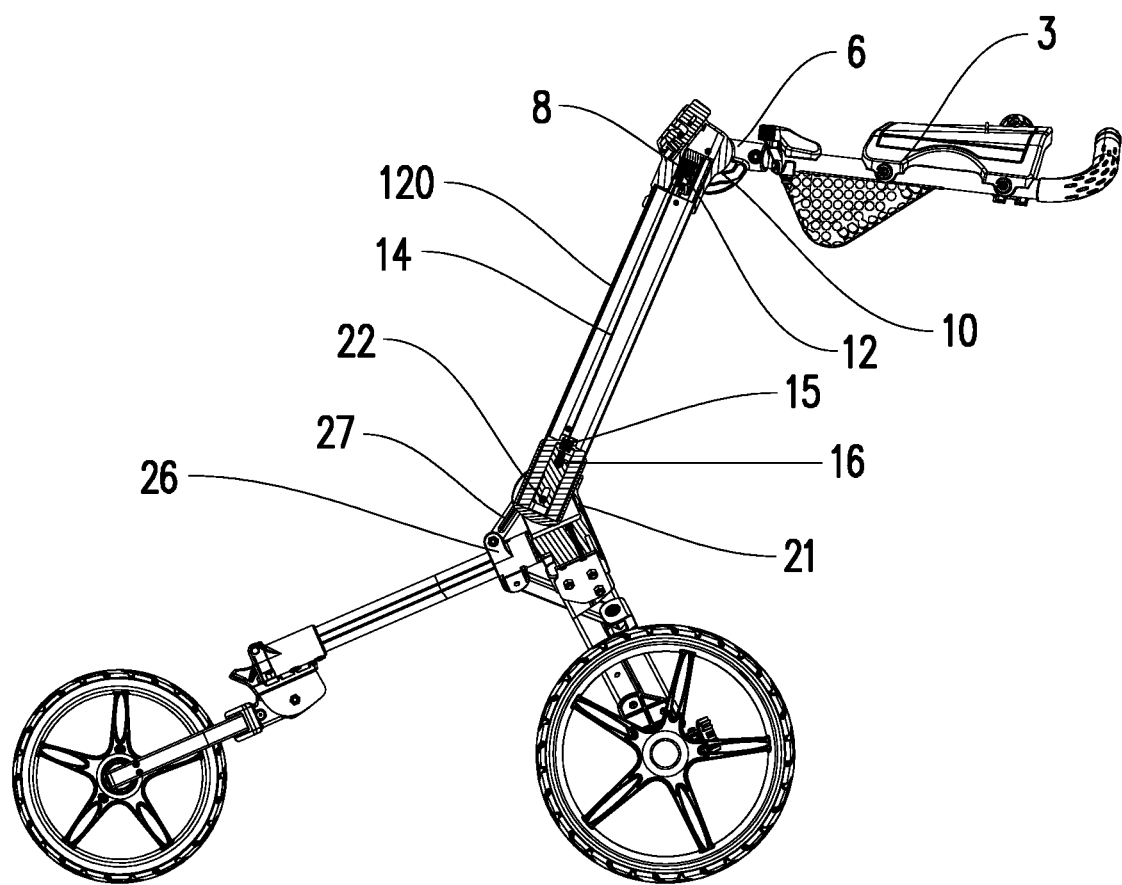
FIG. 6 is a partial sectional view of FIG. 5.
Figure 7:
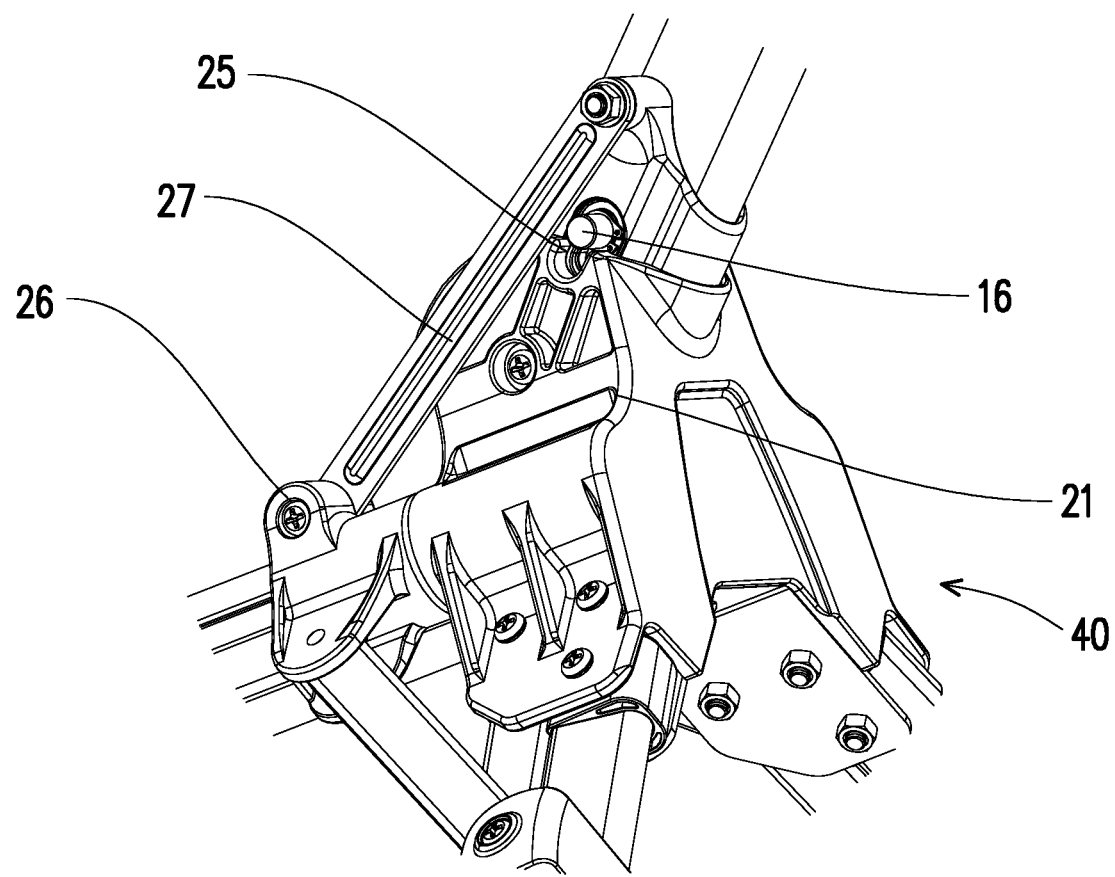
FIG. 7 is an enlarged view of part B in FIG. 5.
Figure 8:
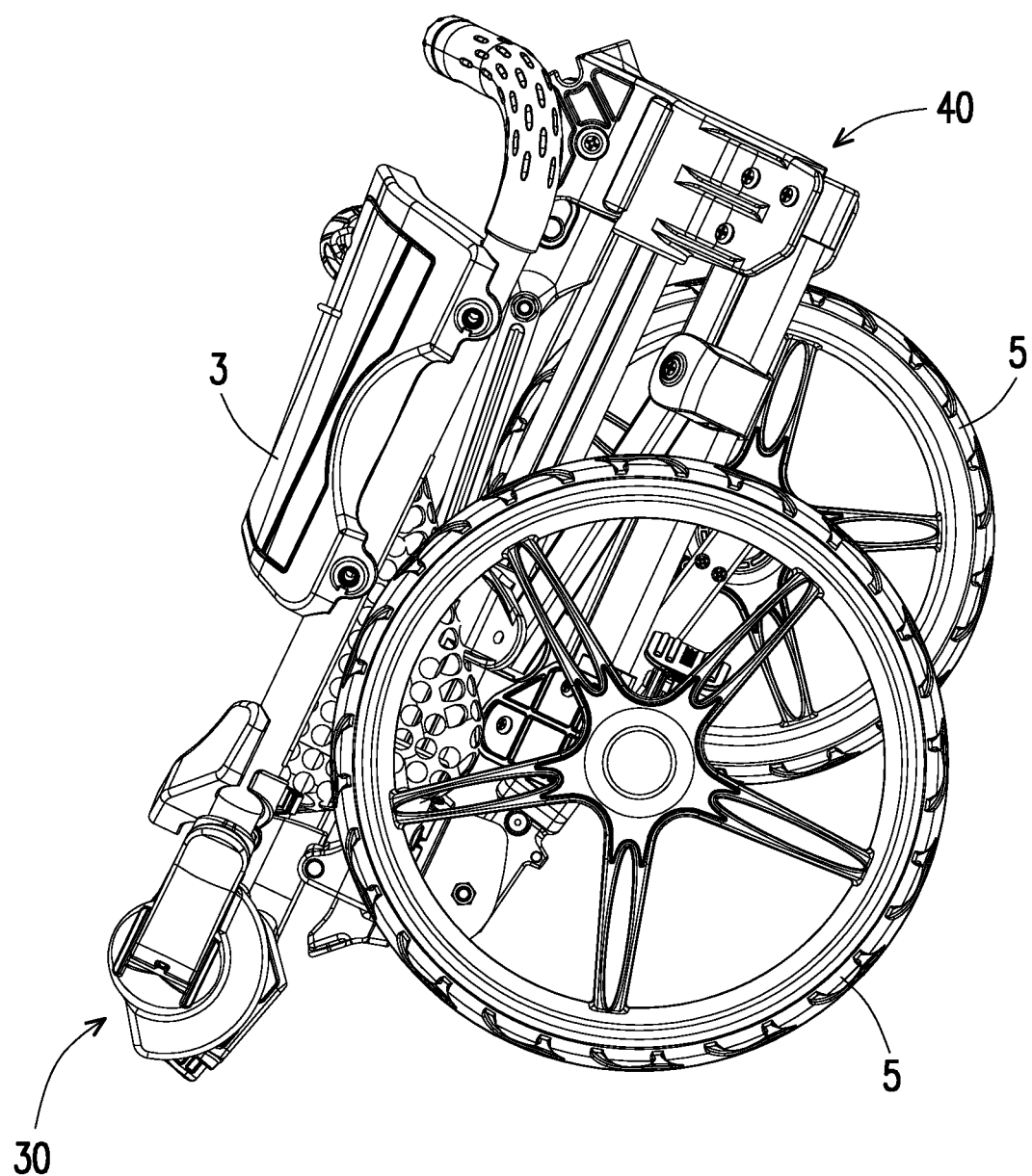
FIG. 8 is a schematic diagram of the foldable golf cart in a folded state.

The invention is further expounded below with reference to the accompanying drawings and embodiments.

Embodiment 1

As shown in the Figures, a foldable golf cart comprises an upper frame 1, a lower frame 2, a handlebar set 3, a front wheel set 4, and two rear wheel sets 5. The upper frame 1 is mounted on the lower frame 2, the front wheel set 4 is mounted at a front end of the lower frame 2, and the two wheel sets 5 are rotatably mounted on a left side and a right side of a rear end of the lower frame 2 respectively. The handlebar set 3 is connected with the upper frame 1 through a first lock mechanism 30, the upper frame 1 is connected with the lower frame 2 through a second lock mechanism 40, and the first lock mechanism 30 and the second lock mechanism 40 are connected through a link mechanism 50. When the first lock mechanism 30 is unlocked, the handlebar set 3 is rotated, and at this moment, the link mechanism 50 drives the second lock mechanism 40 to be unlocked.

In this embodiment, the first lock mechanism 30 comprises a joint assembly 6, a mounting base 7, a connecting shaft 8 connected with the link mechanism 50, and a joint lock piece 9 used for locking the joint assembly 6 and the mounting base 7. The joint assembly 6 is fixedly connected with the handlebar set 3 and is rotatably arranged on the mounting base 7, a guide groove 10 is formed in an inner side of the joint assembly 6 and has an uneven surface, a first guide hole 11 which extends vertically is formed in the mounting base 7, and the connecting shaft 8 is located in the guide groove 10 and the first guide hole 11. After the joint lock piece 9 is unlocked, the connecting shaft 8 synchronously moves in the guide groove 10 and the first guide hole 11 when the handlebar set 3 drives the joint assembly 6 to rotate.

In this embodiment, the link mechanism 50 comprises a first slider 12, a second slider 13, a drive member 14, an elastic mechanism 15, and a stationary shaft 16 connected with the second lock mechanism 40. The upper frame 1 comprises an upper frame tube 120, and the first slider 12 is arranged at an upper end of the upper frame tube 120. A cavity is formed in the mounting base 7, and the upper end of the upper frame tube 120 is located in the cavity. A first through hole 18 is formed in the first slider 12, and the connecting shaft 8 is located in the first through hole 18. When the handlebar set 3 is rotated to drive the joint assembly 6 to rotate, the connecting shaft 8 synchronously moves in the guide groove 10 and the first guide hole 11. The second slider 13 is arranged at a lower end of the upper frame tube 120. The drive member 14 is located in the upper frame tube 120, an upper end of the drive member 14 is fixedly connected with the first slider 12, and a lower end of the drive member 14 is fixedly connected with the second slider 13. The lower end of the elastic mechanism 15 is connected with the second slider 13, and an upper end of the elastic mechanism 15 is connected with the upper frame tube 120. A second through hole 19 is formed in the second slider 13, two second guide holes 20 which extend vertically are formed in side walls of the lower end of the upper frame tube 120, and the stationary shaft 16 is located in the two second guide holes 20 and the second through hole 19.

In this embodiment, the second lock mechanism 40 comprises a connecting base 21 fixed to the lower frame 2, a sliding assembly, a connecting assembly, and a rotary shaft 22. The sliding assembly is mounted on the lower frame 2 and moves forwards and backwards on the lower frame 2 when stressed, the connecting assembly is connected with the sliding assembly and the upper frame tube 120, the sliding assembly is connected with each of the two rear wheel sets 5 through a connecting rod 23, a concave groove 24 and a clamping groove 25 are formed in the connecting base 21, and a lower end of the lower frame 2 is located in the concave groove 24 and is mounted on the connecting base 21 through the rotary shaft 22. When the second lock mechanism 40 is locked, the stationary shaft 16 is located in the clamping groove 25 to be fixed.

What is claimed is:
1. A foldable golf cart, comprising an upper frame, a lower frame, a handlebar set, a front wheel set, and two rear wheel sets, wherein the upper frame is mounted on the lower frame, the front wheel set is mounted at a front end of the lower frame, and the two rear wheel sets are rotatably mounted on a left side and a right side of a rear end of the lower frame respectively; the handlebar set is connected with the upper frame through a first lock mechanism, the upper frame is connected with the lower frame through a second lock mechanism, and the first lock mechanism and the second lock mechanism are connected through a link mechanism; and when the first lock mechanism is unlocked, the handlebar set is rotated, and at this moment, the link mechanism drives the second lock mechanism to be unlocked, wherein the first lock mechanism comprises a joint assembly, a mounting base, a connecting shaft connected with the link mechanism, and a joint lock piece used for locking the joint assembly and the mounting base; the joint assembly is fixedly connected with the handlebar set and is rotatably arranged on the mounting base, a guide groove is formed in an inner side of the joint assembly and has an uneven surface, a first guide hole which extends vertically is formed in the mounting base, and the connecting shaft is located in the guide groove and the first guide hole; and after the joint lock piece is unlocked, the connecting shaft synchronously moves in the guide groove and the first guide hole when the handlebar set drives the joint assembly to rotate.

2. The foldable golf cart according to claim 1, wherein the link mechanism comprises a first slider, a second slider, a drive member, an elastic mechanism, and a stationary shaft connected with the second lock mechanism; the upper frame comprises an upper frame tube, and the first slider is arranged at an upper end of the upper frame tube; a cavity is formed in the mounting base, and the upper end of the upper frame tube is located in the cavity; a first through hole is formed in the first slider, and the connecting shaft is located in the first through hole; and when the handlebar set is rotated to drive the joint assembly to rotate, the connecting shaft synchronously moves in the guide groove and the first guide hole; the second slider is arranged at a lower end of the upper frame tube; the drive member is located in the upper frame tube, an upper end of the drive member is fixedly connected with the first slider, and a lower end of the drive member is fixedly connected with the second slider; a lower end of the elastic mechanism is connected with the second slider, and an upper end of the elastic mechanism is connected with the upper frame tube; a second through hole is formed in the second slider, two second guide holes which extend vertically are formed in side walls of the lower end of the upper frame tube, and the stationary shaft is located in the two second guide holes and the second through hole.

3. The foldable golf cart according to claim 2, wherein the second lock mechanism comprises a connecting base fixed to the lower frame, a sliding assembly, a connecting assembly, and a rotary shaft; the sliding assembly is mounted on the lower frame and moves forwards and backwards on the lower frame when stressed, the connecting assembly is connected with the sliding assembly and the upper frame tube, the sliding assembly is connected with each of the two rear wheel sets through a connecting rod, a concave groove and a clamping groove are formed in the connecting base, and a lower end of the lower frame is located in the concave groove and is mounted on the connecting base through the rotary shaft; and when the second lock mechanism is locked, the stationary shaft is located in the clamping groove to be fixed.

* * * * *